Patented Oct. 14, 1924.

1,511,557

UNITED STATES PATENT OFFICE.

OLIVER M. FRANKLIN, OF AMARILLO, TEXAS, ASSIGNOR TO THE KANSAS BLACKLEG SERUM COMPANY, INC., OF DENVER, COLORADO, A CORPORATION OF COLORADO.

METHOD OF MAKING BLACKLEG VACCINE.

No Drawing. Application filed February 10, 1922. Serial No. 535,662.

*To all whom it may concern:*

Be it known that I, OLIVER M. FRANKLIN, a citizen of the United States, and residing at Amarillo, Potter County, State of Texas, have invented certain new and useful Improvements in Methods of Making Blackleg Vaccine, of which the following is a specification.

My invention relates to a method of preparing a vaccine or bacterin for use in combating the disesase among cattle commonly known as blackleg symtomatic anthrax. This disease is produced by the blackleg organism which is now scientifically termed *Clostridium chauvei* and which is well known to be a very resistant spore forming organism.

The object of the invention is to provide a method of preparing a vaccine for the purpose mentioned by growing in a suitable media a culture of blackleg organisms, otherwise known as symtomatic anthrax, killing the organisms, and treating the product so as to obtain the organisms in a form suitable for use as a vaccine or bacterin to be injected into the cattle and produce immunity from the blackleg disease. More specifically the object of my invention is to prepare a vaccine or bacterin by inoculating into a suitable media a virulent or non-attenuated culture of the blackleg organisms and after suitable growth killing the organisms by the addition of a formalin solution (formaldehyde in water) or other suitable reagent and preferably at the same time heating the culture for a suitable length of time to a temperature not exceeding 50° C., and then recovering the organisms for use as a vaccine. A further object of my invention is to provide a suitable culture media in which the blackleg organism may be successfully grown.

To attain the foregoing objects I proceed in the following manner. A suitable culture media is first prepared. This is done by grinding a quantity of suitable meat substance, preferably hog liver, and extracting the same with water, after which it is cooked and the broth pressed out of the pulp. The usual amount of peptone and salt are then added. It has been found that hog liver bouillon is particularly useful since it forms a liquid media in which the blackleg organisms will grow satisfactorily without the addition of any other meat pulp or growth accelerator except starch as hereinafter pointed out.

After the media is prepared as described, I place therein a cloth sack, preferably made of ordinary muslin, which contains calcium carbonate and starch in suitable quantities. The starch acts to accelerate growth of the organisms and the calcium carbonate tends to stabilize or keep the hydrogen ion concentration near neutral and also apparently facilitates growth of the organisms. This feature of placing the calcium carbonate and starch in a cloth sack has been found to be of considerable utility since it prevents the substances in the sack from mixing with the media and thus simplifies the subsequent separation of the materials in the sack from the organisms in the media. The media thus prepared is then sterilized in the usual manner.

While the blackleg bacillus is considered to be strictly anaerobic, I have found that the organism can be satisfactorily grown under aerobic conditions in a media prepared in the manner heretofore described. In other words, in a liquid media of this kind, the blackleg bacillus can be grown without subjecting it to strict anaerobic conditions or without special anaerobic apparatus. This media therefore possesses particular utility in my process.

After the media has been prepared and sterilized as described, I inoculate the same with a purified culture of blackleg organisms. For such inoculation I employ a freshly isolated culture of blackleg, preferably one obtained from a naturally occurring case of blackleg disease. In other words, I inoculate the media with a non-attenuated, pathogenic or virulent culture of the blackleg organisms. After suitable growth of the organisms has taken place the media is strained through any suitable substance, such as cotton or fine wire gauze, which serves to remove therefrom the coarser solid particles. A formalin solution is then added to the liquid containing the culture, and for this purpose a solution of ordinary commercial strength, approximately 37 to 40% formaldehyde, is preferably employed. The amount of formalin solution used may vary from about ¼ to 1% of the volume of the media, but preferably about ½% is employed. The resulting product is then allowed to stand for several days, about 3 to 7, and during this period it is preferably kept at a temperature of approximately 45° C. as by means of a water bath or in any other desired manner. The treatment with formalin results in killing the organisms in their vegetative and spore forms and this result is accomplished in less time and more satisfactorily if heat is employed as described. The killing of the organisms does not destroy their antigenic property, that is they retain the property of causing reactions in the treated animal as the result of which it becomes more resistant or immune to the blackleg disease.

After the foregoing treatment, the culture is allowed to settle, most of the organisms settling out in a short time. The product is then treated in any suitable way to obtain the organisms in a form for use as a vaccine or bacterin to be injected into the cattle and produce immunity from the blackleg disease. One method of procedure is to decant the supernatant liquid to about $\frac{1}{10}$ of its original volume, the remaining liquid containing the organisms being used as a vaccine. An alternative procedure is to centrifuge the organisms out of the media and dry them. The dry powder thus obtained is used for direct injection as a vaccine by suspending the same in a suitable liquid suspension or, if desired, the dry powder can be made in the form of a pellet and used as a vaccine.

I am aware that vaccines or similar substances for treating blackleg disease have heretofore been proposed, but in general such prior processes are open to numerous objections, involving complicated procedure and in some cases requiring the slaughter of cattle. Furthermore, such processes result in vaccines which are more or less lacking in uniformity, the result being that the treatment of cattle with such vaccines has been attended with uncertainty, the injection in some cases causing fatal proliferation of the blackleg spores, killing the animal, and in others resulting in no immunity from the disease. The improved process herein described is simple and highly efficient and by thorough and extended tests it has been found that the vaccines produced by such process are uniform in quality and act in a very satisfactory manner to produce immunity from the blackleg disease.

Having thus described my invention what I claim as new and desire to secure by Letters Patent is:

1. The method of preparing a blackleg vaccine which consists in growing blackleg organisms in a suitable culture media, adding a reagent to kill the organisms without destroying their antigenic properties, and treating the resulting product to obtain the organisms in suitable form for immunizing use.

2. The method of preparing a blackleg vaccine which consists in growing blackleg organisms in a suitable culture media, treating the same after suitable growth with a formalin solution in concentration sufficient to kill the organisms without destroying their antigenic properties, and treating the resulting product to obtain the organisms in suitable form for immunizing use.

3. The method of preparing a blackleg vaccine which consists in growing blackleg organisms in a suitable culture media, adding a reagent to kill the organisms without destroying their antigenic properties, heating the solution, and treating the resulting product to obtain the organisms in suitable form for immunizing use.

4. The method of preparing a blackleg vaccine which consists in growing blackleg organisms in a suitable culture media, treating the same after suitable growth with a formalin solution in concentration sufficient to kill the organisms without destroying their antigenic properties, heating the solution, and treating the resulting product to obtain the organisms in suitable form for immunizing use.

5. The method of preparing a blackleg vaccine which consists in growing blackleg organisms in a suitable culture media, adding a reagent to kill the organisms without destroying their antigenic properties, heating the solution to a temperature not exceeding 50° C., and treating the resulting product to obtain the organisms in suitable form for immunizing use.

6. The method of preparing a blackleg vaccine which consists in growing blackleg organisms in a suitable culture media, adding a reagent to kill the organisms without destroying their antigenic properties, heating the solution for a period from 3 to 7 days to a temperature not exceeding 50° C. and treating the resulting product to obtain the organisms in suitable form for immunizing use.

7. The method of preparing blackleg vaccine which consists in growing blackleg organisms in a suitable culture media, adding thereto a formalin solution of sufficient strength to kill the organisms without destroying their antigenic properties, heating the solution for a period of from 3 to 7 days at a temperature not exceeding 50° C., and treating the resulting product to obtain the organisms in suitable form for immunizing use.

8. The method of preparing a blackleg vaccine, which consists in growing in a suitable liquid media under aerobic conditions a culture of blackleg organisms, adding to the culture after suitable growth a reagent to kill the organisms without destroying their antigenic properties, and treating the resultant product to obtain the organisms in suitable form for immunizing use.

9. The method of preparing a blackleg vaccine which consists in growing blackleg organisms in a suitable culture media, adding thereto a reagent to kill the organisms without destroying their antigenic properties, and withdrawing a portion of the liquid from the media while retaining the organisms therein, whereby a concentrated solution adapted for use as a vaccine is obtained.

10. A method of making a media for use in growing a bacterial culture which consists in preparing a suitable bouillon or meat extract, placing in the media a suitable quantity of calcium carbonate and starch enclosed in a cloth container and sterilizing the media.

11. A method of making a media for use in growing a culture of blackleg which consists in preparing a bouillon or extract of hog liver, placing in the media a suitable quantity of calcium carbonate and starch enclosed in a cloth container and sterilizing the media.

In testimony whereof I hereunto affix my signature.

OLIVER M. FRANKLIN.

DISCLAIMER 1,511,557.—*Oliver M. Franklin*, Amarillo, Tex. METHOD OF MAKING BLACKLEG VACCINE. Patent dated October 14, 1924. Disclaimer filed October 2, 1933, by the assignee, *The O. M. Franklin Blackleg Serum Company*.

Hereby enters its disclaimer to claims numbered 10 and 11 in said specification, which are in the following words, to-wit:

"10. A method of making a media for use in growing a bacterial culture which consists in preparing a suitable bouillon or meat extract, placing in the media a suitable quantity of calcium carbonate and starch enclosed in a cloth container and sterilizing the media.

"11. A method of making a media for use in growing a culture of blackleg which consists in preparing a bouillon or extract of hog liver, placing in the media a suitable quantity of calcium carbonate and starch enclosed in a cloth container and sterilizing the media."

[*Official Gazette October 31, 1933.*]